Aug. 6, 1929.  E. L. HOUGH  1,723,039
REGULATING SYSTEM
Filed April 19, 1927
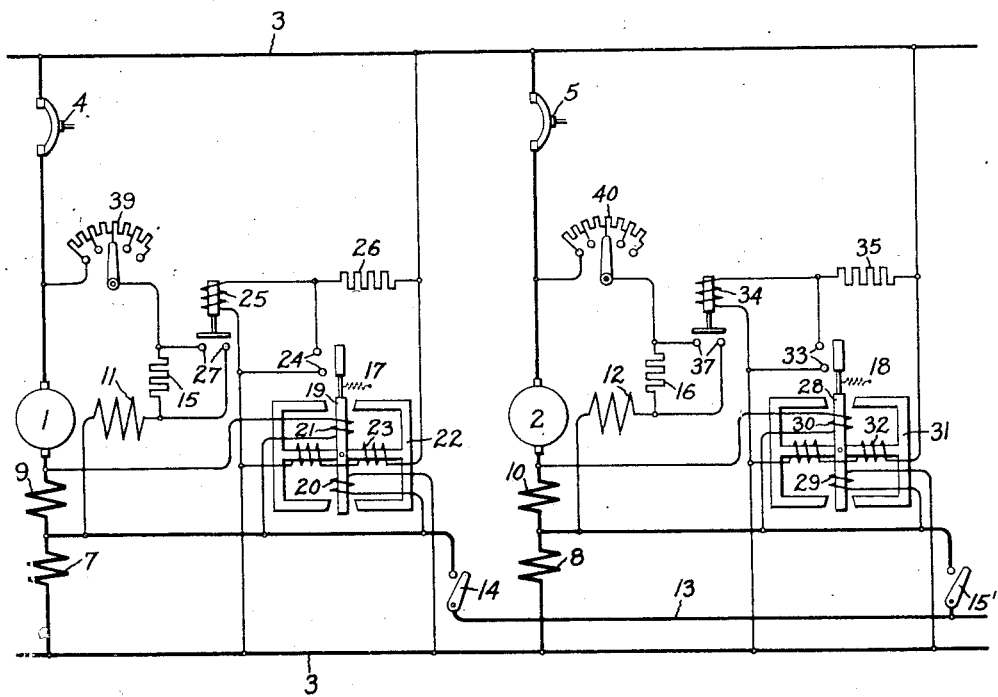
Inventor:
Eugene L. Hough,
by
His Attorney.

Patented Aug. 6, 1929.

1,723,039

UNITED STATES PATENT OFFICE.

EUGENE L. HOUGH, OF ST. LOUIS, MISSOURI, ASSIGNOR TO GENERAL ELECTRIC COMPANY, A CORPORATION OF NEW YORK.

REGULATING SYSTEM.

Application filed April 19, 1927. Serial No. 185,035.

My invention relates to regulating systems for maintaining a predetermined division of load between a plurality of parallel machines and its object is to provide an improved system for accomplishing this result.

My invention is especially applicable to a regulating system for maintaining the load properly divided between a plurality of overcompound direct current generators connected to a common load.

My invention will be better understood from the following description taken in connection with the accompanying drawing, which shows my invention in connection with a load regulating system for two overcompound direct current generators connected in parallel, and its scope will be pointed out in the appended claims.

Referring to the accompanying drawing, 1 and 2 are two overcompound direct current generators which are respectively connected to the direct current load circuit 3 by suitable switching means 4 and 5. These switching means may be of any suitable type and may be controlled either manually or automatically. For example, each means may form a part of an automatic switching equipment, examples of which are well known in the art, whereby it is closed automatically after the respective generator has been started and has reached a predetermined condition.

Each generator is provided with the usual series, commutating, and shunt field windings. As shown in the drawings, 7 and 8 are the series field windings, 9 and 10 are the commutating field windings, and 11 and 12 are the shunt field windings of the generators 1 and 2 respectively.

The series windings 7 and 8 are arranged to be connected in parallel by the equalizer 13. A suitable switching device is associated with each generator for connecting the series winding to the equalizer. In the system shown in the drawing I provide the control switches 14 and 15', associated with the generators 1 and 2 respectively, for this purpose. It will be observed that when both of the switches 14 and 15' are closed the series windings 7 and 8 are in parallel and if their resistances are equal, which is the preferable arrangement, the current flowing through each series field is the average of the currents supplied by both generators. If, however, the resistances of the windings 7 and 8 are unequal the total load current divides between them inversely as their respective resistances. In both cases the voltage drop across the parellel connected series windings is equal to the product of the total load current and the resultant resistance of the parellel connected windings.

For regulating the excitations of the two generators so that the load is divided equally between them, I provide suitable current limiting means 15 and 16, shown as resistors, in the circuits of the shunt field windings 11 and 12 respectively, and differential relays 17 and 18 of any suitable type, examples of which are well known in the art, for respectively controlling a short circuit around the resistors 15 and 16 in accordance with a predetermined relation between the total current supplied by both of the generators and the current supplied by each generator. As shown the differential relay 17 comprises an armature 19 pivotally mounted between two windings 20 and 21 which are wound differentially with respect to each other and which are respectively connected so as to be energized in accordance with the total current output of the two generators and the current output of the generator 1. As shown the winding 20 is connected in parallel with the series winding 7 and the winding 21 is connected in parellel with the commutating winding 9. The armature 19 also is pivoted between polar projections of a stationary magnetic member 22 which is preferably magnetized by a suitable magnetizing winding 23. As shown the magnetizing winding 23 is energized from the circuit 3 but it is obvious that it may be supplied with current from any other suitable source. The armature 19, therefore, occupies different positions depending upon the direction and magnitude of the resultant magnetomotive force produced by the currents through the windings 20 and 21. The armature 19 is normally biased to the position shown in the drawing so that when the ampere turns of the windings 20 and 21 are equal or the ampere turns of the winding 21 exceed the ampere turns of the winding 20 the contacts 24 of the relay 17 are open. When, however, the ampere turns of the winding 20 exceed the ampere turns of the winding 21, the relay closes its contacts 24, thereby short-circuiting a control relay 25 which is connected across the circuit 3 with a suitable resistor 26 in series therewith. The relay 25 when deenergized closes, through its contacts 27, a short circuit around the resistor 15 in the circuit of the shunt field winding 11.

The relay 18 is similar in construction to the relay 17. It is provided with an armature 28 pivotally mounted between two windings 29 and 30 respectively connected in parallel with the series field winding 8 and the series commutating winding 10 and between the polar projections of a stationary member 31 which is magnetized by a magnetizing winding 32 connected across the circuit 3.

The relay 18 is arranged to close its contacts 33 and short-circuit a relay 34 when the ampere turns of the winding 30 are less than the ampere turns of the winding 29. The relay 34 is connected in series with a resistor 35 across the circuit 3 and by closing its contacts 37, when deenergized, completes a short circuit around the resistor 16 in the circuit of the shunt field winding 16.

Suitable adjustable rheostats 39 and 40 may also be provided in the circuits of the shunt field windings 11 and 12 respectively for manually controlling the excitations of the generators.

The operation of the regulating system shown in the drawing is as follows: When the generators are supplying current to the load circuit 3 and their associated equalizer switches are closed, the associated regulating relays operate to maintain the proper load on the generators. Let it be assumed that both generators are supplying current and that both of the equalizer switches 14 and 15' are closed. If the generator 1 tends to take less than its share of the load the winding 21 of relay 17 is energized so that the ampere turns thereof are less than the ampere turns of the winding 20 which is energized in accordance with the total current of the two generators. Consequently, relay 17 closes its contacts 24 and short-circuits relay 25 which in turn completes a short circuit around the resistor 15 so that the excitation of the generator 1 is increased to cause it to increase its current output.

Similarly, if the generator 2 tends to take less than its share of the load the energization of winding 30 is such that its ampere turns are less than the ampere turns of the winding 29. Therefore, relay 18 closes its contacts 33 and deenergizes relay 34 which in turn short circuits the resistor 16 in the circuit of the shunt field winding 12 so that the excitation of the generator 1 is increased to cause it to increase its portion of the total load.

While I have in accordance with the patent statutes shown and described my invention as applied to a particular system and as embodying various devices diagrammatically indicated, changes and modifications will be obvious to those skilled in the art, and I, therefore, aim in the appended claims to cover all such changes and modifications as fall within the true spirit and scope of my invention.

What I claim as new and desire to secure by Letters Patent of the United States, is:—

1. In a regulating system, two generators connected in parallel, means associated with each generator and connected in series therewith, an equalizer for connecting said means in parallel, and a relay for controlling the excitation of one of said generators comprising two differential windings respectively energized in response to the current flowing through said one of said generators and the voltage drop across said parallel connected means.

2. In a regulating system, two overcompound direct current generators connected in parallel, an equalizer for connecting certain of the series field windings of said generators in parallel, and a relay associated with each generator for controlling the excitation thereof comprising two differential windings respectively energized in accordance with the current flowing through the generator and the total current flowing through said parallel-connected series field windings.

3. In a regulating system, a plurality of overcompound direct current generators connected in parallel, each generator having a series field winding and a commutating field winding, switching means associated with each generator for connecting its respective series field winding in parallel with the series field windings of the other generators, and a differential relay associated with each generator for controlling the excitation thereof comprising a winding connected in parallel with its respective commutating field winding and an opposing winding connected in parallel with its respective series field winding.

4. In a regulating system, two sources of current connected in parallel, means associated with each source and connected in series therewith, an equalizer for connecting said means in parallel, and a relay for controlling the output of one of said sources comprising two cooperating windings respectively energized in response to the current supplied by one of said sources and the voltage drop across said parallel series connected means.

5. In a regulating system, two generators connected in parallel, each generator having a series field winding, an equalizer for connecting said series field windings in parallel, and a relay for controlling the excitation of one of said generators comprising two cooperating windings respectively energized in response to the currents flowing through one of said generators and the voltage drop across said parallel connected series field windings.

In witness whereof, I have hereunto set my hand this 16th day of April, 1927.

EUGENE L. HOUGH.